United States Patent [19]

Hong

[11] Patent Number: 5,793,567
[45] Date of Patent: Aug. 11, 1998

[54] SPINDLE MOTOR FOR DISK DRIVE

[75] Inventor: Weon Ki Hong, Kyunggi-do, Rep. of Korea

[73] Assignee: Samsung Electro-Mechanics Co.Ltd., Kyunggi-do, Rep. of Korea

[21] Appl. No.: 692,729

[22] Filed: Aug. 6, 1996

[30] Foreign Application Priority Data

Jan. 30, 1996 [KR] Rep. of Korea .................. P96-2133

[51] Int. Cl.$^6$ .................................................. G11B 17/02
[52] U.S. Cl. .................................................. 360/99.08
[58] Field of Search ........................... 360/99.08, 99.07, 360/99.04, 97.02, 97.03; 384/112, 114–115, 119–120, 132

[56] References Cited

U.S. PATENT DOCUMENTS

| 4,726,693 | 2/1988 | Anderson et al. | 384/114 |
| 5,491,596 | 2/1996 | Kobori | 360/97.02 |

*Primary Examiner*—Allen Cao
*Attorney, Agent, or Firm*—Ladas & Parry

[57] ABSTRACT

Disclosed is a spindle motor of drive system for driving a disk such as a hard disk. The spindle motor can prevent impurities from flowing thereinto and avoid contamination caused by dispersion of a lubricating oil such as grease filled in a bearing thereof. The spindle motor of the disk drive for reproducing or recording information from or onto a disk has a stator core installed on a shaft of a housing, bearings mounted on both lower and upper portions of the shaft, and a hub for mounting the disk. The hub has a magnet at an inner circumference thereof. The shaft has an air inlet opening which is transversely formed in the shaft and an air flow opening which is formed at a center of the shaft. The air flow opening is communicated with the air inlet opening at a right angle. A spiral sealing member is installed at a center of an upper portion of the hub. The spiral sealing member is formed at a bottom of a lead end thereof with a spiral portion, thereby preventing not only impurities from flowing into the spindle motor, but also the lubricating oil from dispersing out of the bearings by a spiral action of the spiral sealing member.

6 Claims, 2 Drawing Sheets

SPINDLE MOTOR FOR DISK DRIVE

BACKGROUND OF THE INVENTION

1. Field of the Invention

The present invention relates to a drive system for driving a disk such as a hard disk, and more particularly to a spindle motor for a disk drive which can prevent impurities from flowing thereinto and can avoid contamination caused by dispersion of a lubricating oil such as a grease filled in a bearing thereof.

2. Description of the Prior Art

Generally, as shown in FIG. 1, a spindle motor comprises a shaft 2 which is supported by a bearing 3 at a center of a housing 1 mounted on a set base, a hub 4 which is provided with a magnet 5 and is installed on the shaft 2 so as to support a disk, a stator core 6 disposed between the housing 1 and the hub 4, a connector 7 installed at the housing 1, and a sealing member 803 disposed at an upper end of the bearing 3.

In the spindle motor having the above construction, the hub 4 disposed on the housing 1 rotates about the shaft 2 by the interaction between the stator core 6 and the magnet 5, so that the disk mounted on the hub 4 may reproduce information therefrom or record information thereon while rotating together with the hub 4. However, there is a problem that a lubricating oil such as grease filled in the bearing 3 may be dispersed out of the bearing 3 when the hub 4 rotates, thereby contaminating both the hub 4 and the disk. In order to prevent this contamination, the sealing member 803 is disposed at the upper end of the bearing 3.

On the other hand, other conventional sealing devices as shown in FIGS. 2 and 3 have been suggested in order to solve the above problem. The conventional sealing device shown in FIG. 2 includes a magnetic fluid seal 801 disposed at an upper portion of the bearing 3. The magnetic fluid seal 801 provides a fluid-film between the shaft 2 and the magnetic fluid seal 801 by means of magnetic force, thereby preventing the lubricating oil that has dispersed out of bearing 3 from flowing to the exterior of the hub 4.

However, the above described conventional sealing device has disadvantages in that it requires very precise installation of the magnetic fluid seal 801 in order to prevent dispersion of the lubricating oil, so that the installation of the magnetic fluid seal 801 is very difficult. Furthermore, the magnetic fluid seal may be dispersed as the hub rotates at high speed. For this reason, the magnetic fluid seal does not provide an improved sealing effect. Moreover, this kind of dispersion of the magnetic fluid seal may have an adverse effect on the disk when the disk reproduces information therefrom or records information thereon.

In addition, another conventional sealing device shown in FIG. 3 includes a labyrinth seal 802 which is disposed at the center of an upper portion of the hub 4 so as to prevent the lubricating oil from dispersing out of the bearing 3. Dispersion of the lubricating oil filled in the bearing 3 can be prevented by causing pressure variation on the labyrinth seal 802 when hub 4 rotates. The pressure variation on the labyrinth seal 802 is attained by varying the area of the labyrinth seal 802 by adjusting dimensions of a, b, c, and d of the labyrinth seal 802. However, the labyrinth seal 802 has a lower sealing effect than that of the above mentioned magnetic fluid seal 801. In addition, it is difficult to properly adjust the dimensions a, b, c, and d. Furthermore, the sealing effect of preventing dispersion of the lubricating oil may depend on the variation of the dimensions a, b, c, and d, so that effective sealing is impossible.

SUMMARY OF THE INVENTION

The present invention seeks to overcome the above described problems of the prior art, and accordingly, it is an object of the present invention to provide a spindle motor for a disk drive, in which a spiral sealing member is installed at the center of an upper portion of a hub so as to prevent impurities from flowing into the spindle motor, and in which a lubricating oil filled in a bearing thereof is prevented from dispersing out of the spindle motor.

To achieve the above objects, the present invention provides a spindle motor of a disk drive for reproducing or recording information from or onto a disk. The spindle motor comprises a stator core installed on a shaft of a housing, bearings mounted on both lower and upper portions of the shaft, and a hub for mounting the disk. The hub has a magnet at an inner circumference thereof. The shaft has an air inlet opening which is transversely formed in the shaft and an air flow opening which is formed at a center of the shaft. The air flow opening is communicated with the air inlet opening at a right angle. A spiral sealing member is installed at a center of an upper portion of the hub. The spiral sealing member is formed at a bottom of a lead end thereof with a spiral portion, thereby preventing not only impurities from flowing into the spindle motor, but also a lubricating oil from dispersing out of the bearings by a spiral action of the spiral sealing member.

BRIEF DESCRIPTION OF THE DRAWINGS

The above object, other features and advantages of the present invention will become more apparent by describing the preferred embodiments thereof with reference to the accompanying drawings, in which.

DETAILED DESCRIPTION OF THE PREFERRED EMBODIMENTS

Figure 1:
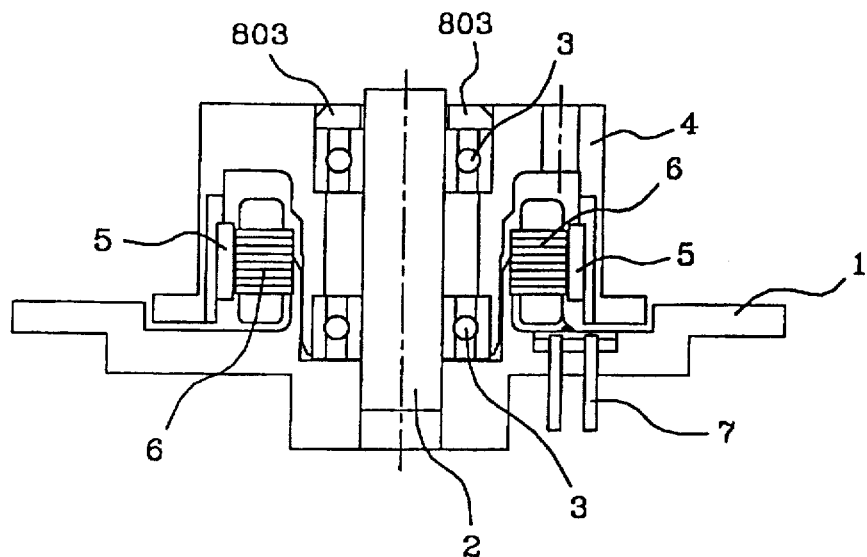
FIG. 1 is a sectional view showing a structure of a conventional spindle motor.
Figure 2:
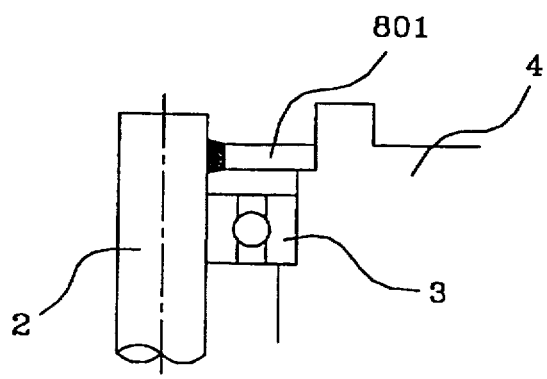
FIGS. 2 and 3 are views showing conventional spindle motors having seals therein, respectively.
Figure 3:
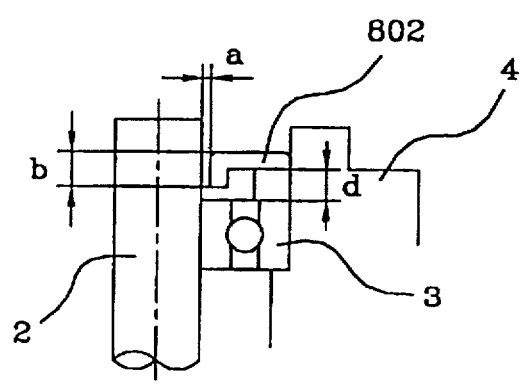
Figure 4:
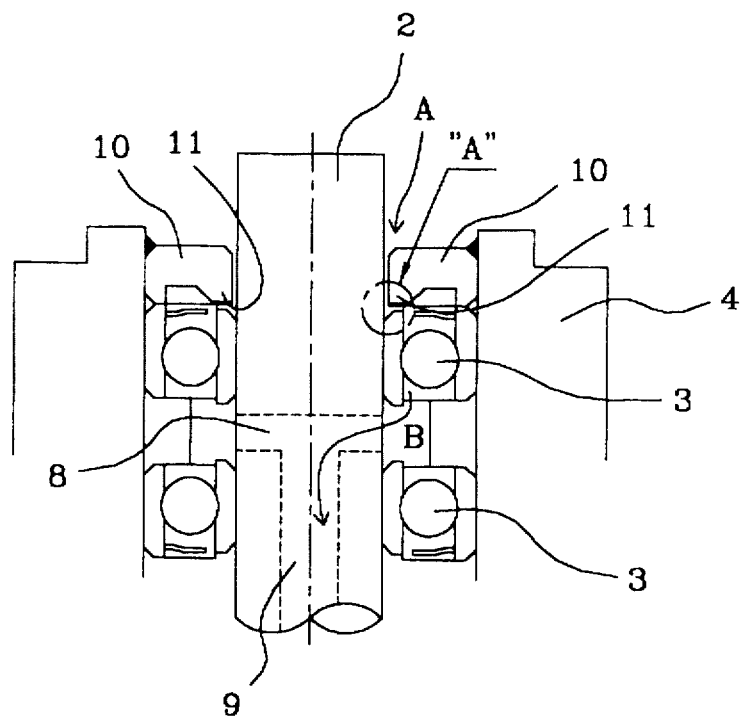
FIG. 4 is a sectional view according to one embodiment of the present invention.

According to one embodiment of the present invention having the construction as mentioned above, the hub 4 is rotated on the bearing 3 surrounding the shaft 2 by the magnetic interaction between the stator core 6 disposed at the housing 1 and the magnet 5 provided in the hub 4, so that the disk mounted on the hub 4 may reproduce information therefrom or record information thereon while rotating together with the hub 4. The bearing 3 is filled with a lubricating oil in order to allow the hub 4 to easily rotate.

Therefore, it is possible for the lubricating oil filled in the bearing 3 to be dispersed when the bearing 3 rotates. In order to prevent such dispersion of the lubricating oil, a spiral sealing member 10 which is provided at a bottom of a lead end 11 thereof with a spiral portion 12 is mounted on the upper portion of the bearing 3. As the hub 4 rotates, the spiral sealing member 10 also rotates so that a centrifugal force is generated by the spiral portion 12 of the spiral sealing member 10. As a result, air existing at the exterior of the motor flows into a gap (about 0.02–0.05 mm) formed between an outer circumference of the bearing 3 and an inner circumference of the spiral sealing member 10 by the centrifugal force, which is called a "centrifugal pump effect", thereby preventing the lubricating oil filled in the bearing 3 from dispersing to the exterior of the motor.

In addition, air that has flowed into the gap may flow in an air-flow direction as indicated by arrows A and B, and then, flow along an air inlet opening 8 and an air flow opening which are formed in the shaft 2. Then, air that has passed through the air flow opening 9 exhausts to the exterior of a hard disk drive set.

Figure 5:
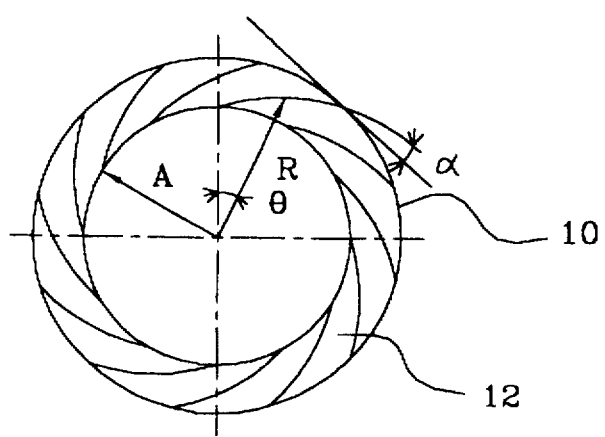
FIG. 5 is an enlarged bottom view of detail "A" portion shown in FIG. 4.

Preferably, as shown in FIG. 5, the spiral portion 12 formed at the bottom of the lead end 11 of the spiral sealing member 10 has a radius defined by following equation: R=A×E×P (θ×tan α), wherein α is a tangent angle. The spiral portion 12 can be manufactured by discharging, etching, or coning working.

The spiral sealing member of the present invention, which prevents not only the lubricating oil from dispersing out of the bearing 3 by the above mentioned operation, but also impurities from flowing into the bearing 3 by an air flowing action, can attain a more effective result as compared with those of the conventional seals as shown in table 1.

TABLE 1

(unit: ft³)

| size | magnetic fluid | labyrinth | spiral sealing | note |
|---|---|---|---|---|
| 0.3 μm | 7 | 10 | 2 | |
| 0.5 μm | 2 | 5 | 0 | |
| (R.P.M.: 5,400, Time: 60 minutes, Data: X) | | | | |

As understood from the above table 1, the sealing effect attained by the spiral sealing member of the present invention is better than those of the conventional seals. In addition, the spiral sealing member of the present invention can be manufactured at a lower cost as compared with the conventional seals. For example, the labyrinth seal can be manufactured at a fifty-percent cost with respect to the magnetic fluid seal, and the spiral sealing member of the present invention can be manufactured at a forty-percent cost with respect to the magnetic fluid seal.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. A spindle motor of a disk drive for reproducing or recording information from or onto a disk, the spindle motor comprising:

a stator core installed on a shaft of a housing;

bearings mounted on both lower and upper portions of the shaft; and a hub for mounting the disk, the hub having a magnet at an inner circumference thereof, wherein the shaft has an air inlet opening which is transversely formed in the shaft and an air flow opening which extends axially with the center of the shaft, the air flow opening being connected to the air inlet opening at a right angle, a spiral sealing member being installed in an upper portion of the hub to surround said shaft, the spiral sealing member having a lower end and provided with circumferentially spaced spiral grooves extending along said spiral sealing member from said lower end thereof and an air flow is produced in said spiral grooves by a centrifugal force upon rotation of said hub, said air flow having a path extending from outside said spindle motor through a spacing between said shaft and said spiral sealing member, then through the bearing mounted on said upper portion of the shaft and thereafter into said transversely extending air inlet and said axially extending air flow opening in said shaft so that impurities are prevented from flowing to said disk on the hub while a lubricating oil in the bearings is also prevented from dispersing out of the bearings to said disk.

2. A spindle motor as claimed in claim 1, wherein each of the spiral grooves has a radius defined by following equation, R=A×E×P (θ×tan α), wherein α is a tangent angle.

3. A spindle motor as claimed in claim 1, wherein said transversely formed inlet opening extends below said upper bearing.

4. A spindle motor as claimed in claim 3, wherein said spiral sealing member is disposed above said upper bearing.

5. A spindle motor as claimed in claim 4, wherein said spacing between the shaft and said spiral sealing member is uniform therebetween.

6. A spindle motor as claimed in claim 5, wherein said spiral grooves are limited to a lower end portion of the spiral sealing member.

* * * * *